INVENTOR.
FRANK T. OGLE

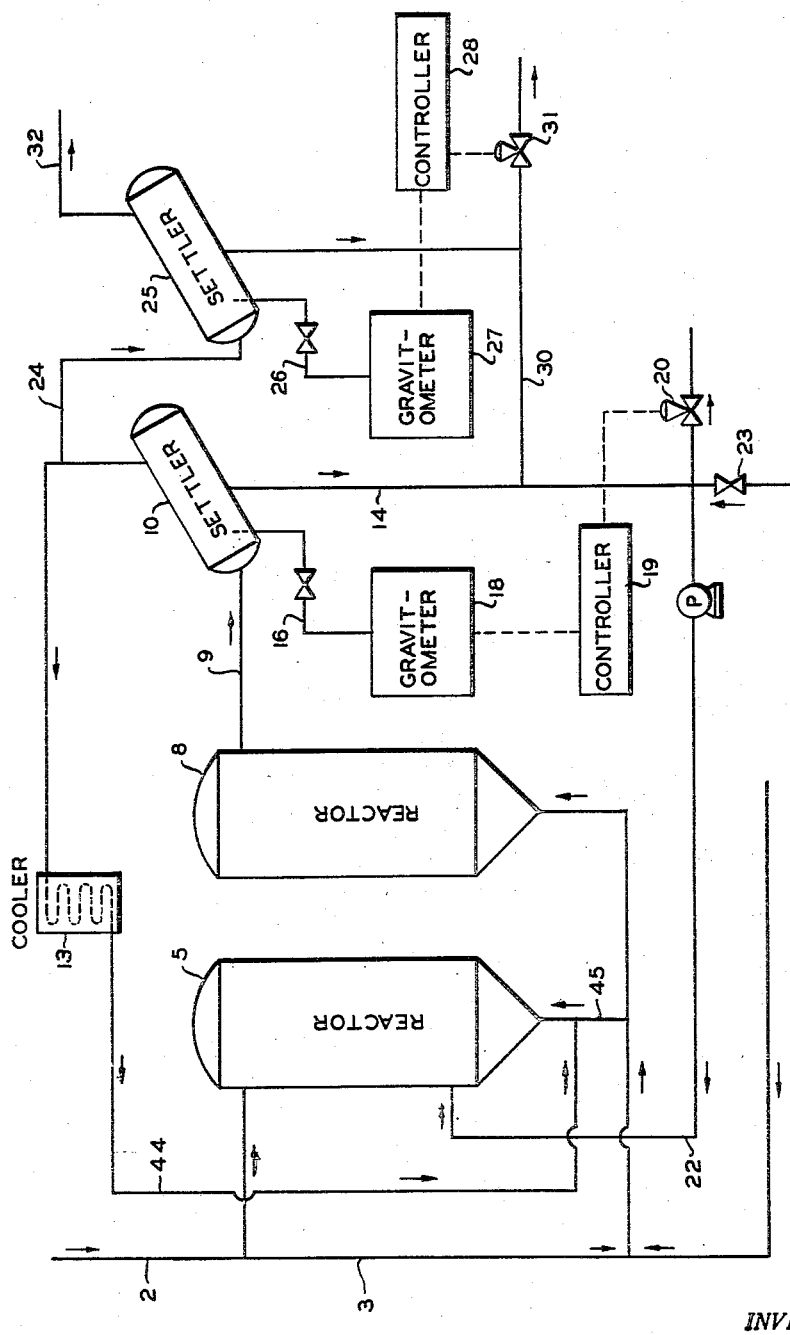

United States Patent Office 2,850,552
Patented Sept. 2, 1958

2,850,552

CONTROL OF REACTIONS INVOLVING FLUIDS OF DIFFERENT DENSITIES

Frank T. Ogle, Phillips, Tex., assignor to Phillips Petroleum Company, a corporation of Delaware Application June 30, 1952, Serial No. 296,464

5 Claims. (Cl. 260—683.43)

This invention relates to the control of chemical reactions in which there are involved fluids of different densities. In one aspect the invention relates to the control of a reaction in which there are involved liquid reactants and a fluid catalyst. In another aspect this invention relates to the alkylation of hydrocarbons. In still a further aspect this invention relates to the alkylation of an isoparaffin with an olefin, for example, isobutane with ethylene, to prepare alkylate having a high octane blend value. In a further aspect still this invention relates to the preparation of diisopropyl by the alkylation of isobutane with ethylene in the presence of an aluminum chloride catalyst. In still another aspect this invention relates to the preparation of diisopropyl from isobutane and ethylene, employing an aluminum chloride hydrocarbon complex catalyst, wherein the relative proportion of catalyst and hydrocarbon in the reaction zone is controlled by determining automatically the relative proportions of hydrocarbon and catalyst present by measuring the specific gravity of one or more of a hydrocarbon phase and a catalyst phase at a point or points in the process. In yet another aspect this invention relates to the control of the quantity of catalyst and hydrocarbon present in an alkylation reactor by measuring the density of the reactor effluent automatically and automatically relaying the measurement value in the form of energy to control flow rates within the operation. In yet another aspect, this invention relates to apparatus in combination for effecting operations as herein described. Other aspects of this invention are obvious from a consideration of this disclosure, the drawing and the claims.

It is known in the art that the yields, extent of conversion, and alkylate quality resulting from an operation, for example, the diisopropyl process, are affected by the catalyst activity, the addition of promoter, and the hydrocarbon to catalyst ratio in the reactors. Catalyst activity is, of course, influenced by the rate of addition of fresh aluminum chloride. It is further influenced by the presence of undesirable constituents in the feed. The addition of hydrogen halide or, in its place, water, to generate in situ the hydrogen halide required to promote the catalyst, by reaction of the water with the aluminum chloride, can be controlled rather readily and satisfactorily but there is yet apparent no satisfactory control of the hydrocarbon to catalyst ratio. The control of this ratio is of extreme importance. For example, if a unit operating to produce diisopropyl by alkylation of isobutane with ethylene in the presence of aluminum chloride-hydrocarbon complex catalyst can be operated at a conversion of 92 to 94 percent with presently available methods for controlling the hydrocarbon to catalyst ratio, it is obvious that any method for controlling the said hydrocarbon to catalyst ratio which will improve the ethylene conversion will be highly desirable. Thus, if the conversion figure could be raised to 96–97 percent, not only would there result a higher yield of alkylate but this higher yield of alkylate would be obtained without any substantial loss in quality. At the present time, yields of 96–97 percent conversion of ethylene are unobtainable because it is not possible to maintain the close control which would be required.

According to this invention, there is provided a very close control of the hydrocarbon to catalyst ratio in an operation such as the alkylation of an isoparaffin with an olefin to form high octane value hydrocarbons boiling within the gasoline boiling range which comprises determining the overall density of one of a hydrocarbon effluent, a hydrocarbon phase, and a catalyst phase extant within the confines of such an operation. Thus, according to this invention, the reactor effluent of an alkylation in which isobutane is alkylated with ethylene in the presence of aluminum chloride-hydrocarbon complex catalyst, is, in part, passed through a gravitometer which in turn controls the operation of a flow controller which in turn controls flow controller valves upon catalyst disposal and catalyst recycle lines. Also, according to the invention, the material fed to the gravitometer can result not only from the reactor effluent but also from a point or points in one of the settlers which are employed in such an alkylation operation.

The invention will now be described in greater detail with special reference to the drawing. It will be understood that while the drawing and its description relate especially to alkylation of isobutane with ethylene in the presence of aluminum chloride-hydrocarbon complex catalyst, the invention is applicable to other alkylation operations and, indeed, to operations in which fluids having different densities are to be proportioned.

Referring now to the drawing, in Figure 1 of which is shown an embodiment of the invention, assuming the unit in operation, the placing on stream of which is within the skill of the art in possession of this disclosure, ethylene introduced through conduit 2 is admixed with isobutane from conduit 3 and the admixture thus obtained is passed through conduit 4 into reactor 5. In reactor 5, alkylation of the isobutane with substantially all of the ethylene present will occur. The reactor is maintained substantially completely filled, containing hydrocarbon-catalyst emulsion comprising isobutane, ethylene, and alkylated hydrocarbons in the hydrocarbon phase and an aluminum chloride catalyst in the catalyst phase. The emulsion mixture passes from reactor 5, by way of conduits 6 and 7 to reactor 8 for completion of reactions of alkylation and thence through conduit 9 to primary settler 10 wherein separation of hydrocarbon phase (upper) and catalyst phase occurs. Hydrocarbon, which may contain a slight amount of suspended catalyst, is taken off at the top of settler 10, and a substantial portion thereof is passed through conduit 11, valve 12, cooler 13, and conduits 44 and 45, and then into reactor 5 to maintain a desired alkylation temperature therein.

According to the invention, conduit 9, primary settler 10, and catalyst drawoff conduit 14 are provided with conduits 15, 16 and 17 by means of which a portion of the reactor effluent, in said conduit 9, and a portion of the catalyst phase in said conduit 14 and in said primary settler 10, is passed into and ultimately out from a gravitometer 18 in which the specific gravity of the material can be measured or determined continuously. Operatively connected to gravitometer 18, by means of controller unit 19, are flow controller valve 20 on waste catalyst line 36, flow controller valve 21, on catalyst recycle conduit 22, and flow controller valve 12 on conduit 11. Suitably adjusted preliminarily to the operation of the plant, by, tapping one or more of conduits 9 and 14 and primary settler 10, through adjustable valves or conduits 15, 16, and 17, the gravitometer and controller will control the flow rate of catalyst recycled to reactor 5 through conduit 22. It is noted that provision is made to remove from conduit 22 a portion of the catalyst flowing therein. Also there is provision to add fresh or make-up catalyst to conduit 22. The controller 19 can regulate the valve 20 or it might be made to regulate valve 20 and valve 23 in manner to automatically, if desired, proportion the make-up catalyst to that taken away through valve 20. With the flow plan as shown the inlet of make-up catalyst would be accomplished intermittently at times when catalyst is not being withdrawn through conduit 36.

The portion of the hydrocarbon phase, in primary settler 10, not recycled to reactor 5, is taken off through conduit 24 and passed into secondary settler 25. As in the case of primary settler 10, secondary settler 25 is equipped with a gravitometer 27, fed a portion of the catalyst phase through valved conduit 26. By means of controller 28, conduits 29 and 30, and flow controller valve 31, used catalyst is withdrawn from the unit and/or recycled depending upon and correlated with specific gravity and/or activity thereof.

Finally, hydrocarbons are taken off from settler 25 and passed through conduit 32 into separating means 33 and separated as desired, usually into light gases, which may be recycled to the unit, if desired, n-butane which can be isomerized to isobutane and then recycled, recycle isobutane which is recycled by conduit 3 together with fresh isobutane introduced through conduit 34. Diisopropyl is removed through line 37, and heavy alkylate through line 38.

Figure 4 shows determination of the specific gravities at a point in the primary and secondary settlers and control thereby of the catalyst removed from the processing, indirectly controlling the catalyst recycled.

Figure 1:
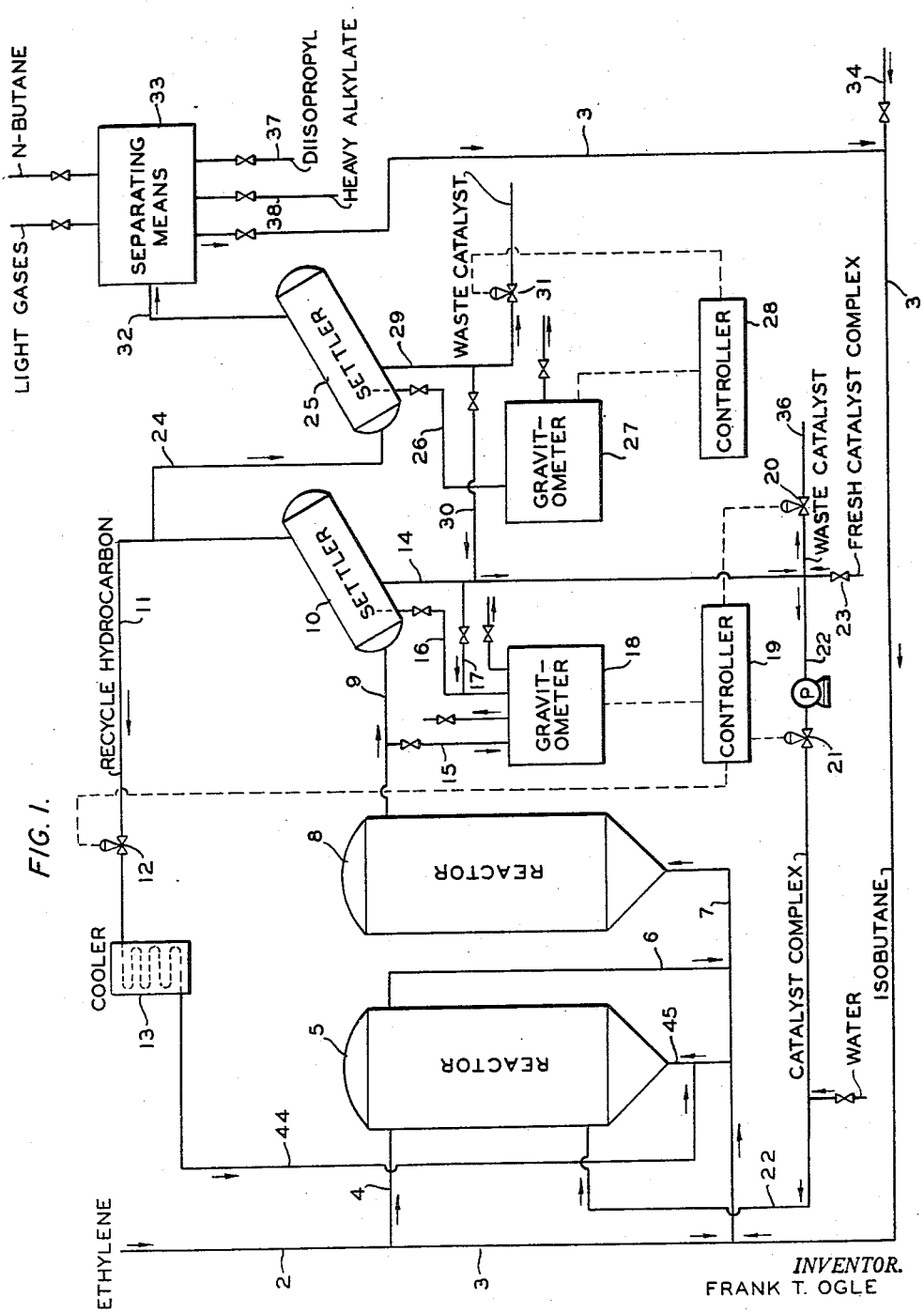
Figure 2:
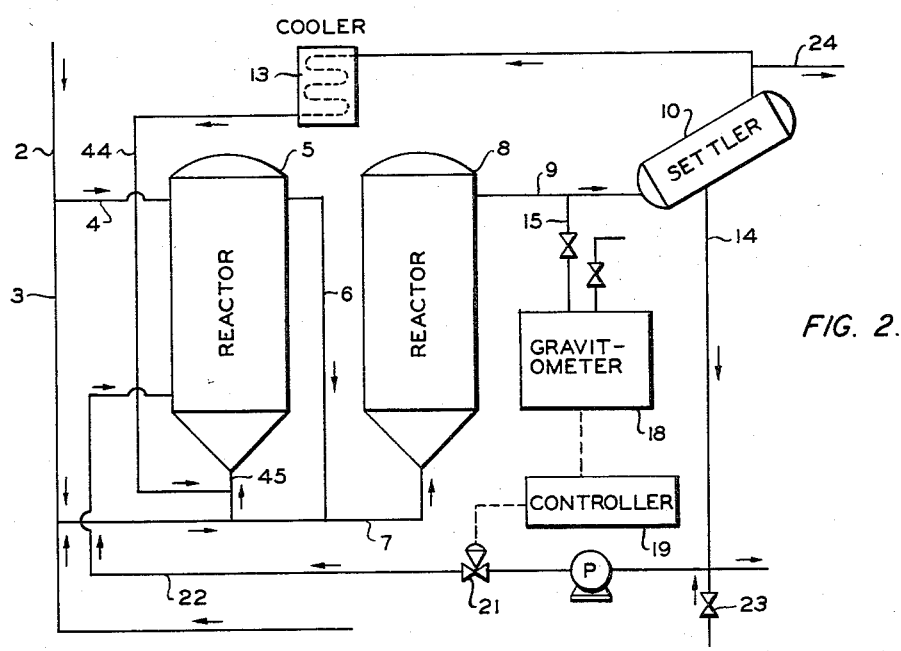
Figure 2 shows diagrammatically an application of the invention to an alkylation operation in which the catalyst recycle flow rate is controlled by determination of the specific gravity of only the effluent from a secondary reactor.
Figure 3:
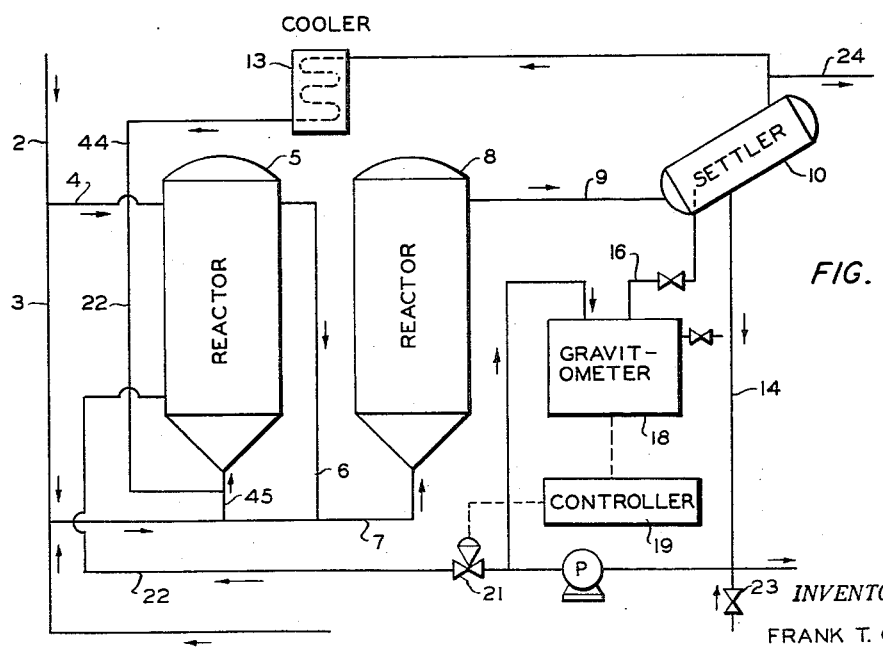
Figure 3 shows determination of the specific gravities of the material in the primary settler and in the catalyst recycle conduit and control of the catalyst recycle.

It is to be understood that it is within the scope of the invention to also control the rate of recycle of unreacted hydrocarbon in lieu of the recycle rate of catalyst. Or, catalyst recycle and hydrocarbon recycle rates both can be controlled, as shown.

It is possible that from time to time there may be experienced a change in catalyst viscosity which may affect somewhat the catalyst settling rate. Therefore, the now preferred form of the invention is that in which at least the principal, if not all, regulation of flow rates is made to be responsive to the specific gravities of the reactor effluent which by gravity will depend upon the catalyst to hydrocarbon ratio therein, the density of the catalyst (AlCl$_3$-hydrocarbon complex) being of the order of 1.3 and that of the hydrocarbon (alkylate and unreacted fluid) of about 0.6. The density of the catalyst complex usually varies in the range of 1.25–1.32 and the density of the hydrocarbon phase varies in the range 0.5–0.65.

Broad limits on the hydrocarbon to catalyst ratio are from about 1:1 to 6:1, with the presently preferred range being 2:1 to 4:1. Because of the nicety of control provided by this invention, it is possible to operate at even higher hydrocarbon to catalyst ratios.

As will be understood by those skilled in this art, it is essential to determine the density at any given point of the operation or unit at which the control of the invention is to be applied and to then so calibrate the gravitometer and its controller and then adjust the valves so that for the said density a given desired hydrocarbon to catalyst ratio can be maintained.

As stated, the invention is not to be limited to the specific embodiments thereof which have been described. Indeed, the invention is equally applicable to catalysts other than aluminum chloride-hydrocarbon complex catalysts. For example, hydrofluoric acid catalysts can be employed.

In the event that a reactor effluent contains an undesirable quantity of gases which would hinder the proper operation of a gravitometer, the portion of effluent which is removed can first be degassed and then passed through the gravitometer. Thus, in an alkylation in mixed phase in which methane and hydrogen are present in the hydrocarbon feed to the reactor, the methane and hydrogen can be suitably removed from that portion of the effluent which is passed through the gravitometer.

The preparation of diisopropyl alkylate is discussed in the Oil and Gas Journal of February 9, 1946, beginning on pages 70–73 and continuing on pages 103–107.

An example of a commercially available gravitometer suitable for use in the process of this invention is the Republic pneumatic liquid density transmitter manufactured by the Republic Flow Meters Company of Chicago, Illinois. This instrument transmits an air pressure signal which varies proportionally to the variations in density of the liquid being measured; hence, a conventional air-operated controlled may be employed in conjunction with it to comprise the instruments 18, 19, or 27, 28 of the drawing, controlling the operation of valves 12, 20 and 21, or the operation of valve 31.

Variation and modification are possible within the scope of the foregoing disclosure, drawing, and the appended claims to the invention, the essence of which is that the rate of catalyst flow or flows, or hydrocarbon flows, and therefore the ratio of catalyst to hydrocarbon, are controlled by measuring specific gravity at some place in the process, as described, and then translating the said measurement of specific gravity into a controller which is employed to suitably regulate flows at desired points in the process, as described. The chief value of this invention is that it provides a continuous measurement and control of one of the important process variables, namely, the hydrocarbon to catalyst ratio in the reactors, which ratio is dependent upon catalyst level in the primary settler and other changes which occur over a wide range. The concentration of catalyst in the catalyst recirculation stream may vary from 40 to 80 liquid volume percent with variation in catalyst level in the primary settler. Therefore, the advantage of the method of the invention is clear.

I claim:

1. In a hydrocarbon conversion process comprising the steps of making a mechanical mixture comprising reactive hydrocarbon, and an immiscible fluid hydrocarbon reacting catalyst, reacting and converting a portion of said reactive hydrocarbon in the presence of said mechanically mixed catalyst to form a converted hydrocarbon and catalyst containing total effluent, the specific gravity of the hydrocarbon portion of said total effluent being substantially different from that of said fluid catalyst, separating the hydrocarbon portion of said total effluent from said catalyst, recycling a portion of said separated hydrocarbon portion of said effluent to said conversion process and recycling to said conversion process the major portion of said separated catalyst, the improvement comprising measuring the specific gravity of said total effluent, and controlling the ratio of catalyst to the hydrocarbon portion present in said conversion process by controlling the relative rates of said two recycles to tend to maintain said specific gravity of said total effluent at a predetermined desired value.

2. The process of claim 1 in which said relative rates of recycle are controlled by controlling said catalyst recycle rate.

3. The process of claim 1 in which said relative rates of recycle are controlled by controlling said hydrocarbon recycle rate.

4. The process of claim 1 in which the catalyst is an aluminum chloride-hydrocarbon complex catalyst, and the reactive hydrocarbon comprises ethylene and isobutane.

5. The process of claim 1 in which the catalyst is a hydrofluoric acid catalyst, and the reactive hydrocarbon comprises ethylene and isobutane.

References Cited in the file of this patent

UNITED STATES PATENTS

| | | |
|---|---|---|
| 2,314,822 | Quesada | Mar. 23, 1943 |
| 2,477,290 | Dornte et al. | July 26, 1949 |
| 2,592,063 | Persyn | Apr. 8, 1952 |